US008619987B2

(12) United States Patent
Hong et al.

(10) Patent No.: US 8,619,987 B2
(45) Date of Patent: Dec. 31, 2013

(54) SYSTEM FOR TRANSMITTING THE SCRAMBLED BROADCAST-SIGNALS IN SINGLE FREQUENCY NETWORK, AND A METHOD THEREOF

(75) Inventors: Chung-Pyo Hong, Seoul (KR); Tae-June Chae, Seoul (KR); Won-Jin Park, Seongnam (KR); Hyun Lee, Daejeon (KR); Soo-In Lee, Daejeon (KR); Gwang-Soon Lee, Daejeon (KR); Bong-Ho Lee, Daejeon (KR); Jong-Soo Lim, Daejeon (KR)

(73) Assignees: KT Corporation, Seongnam (KR); Electronics and Telecommunications Research Institute, Daejeon (KR)

( * ) Notice: Subject to any disclaimer, the term of this patent is extended or adjusted under 35 U.S.C. 154(b) by 1600 days.

(21) Appl. No.: 11/909,543

(22) PCT Filed: Nov. 4, 2005

(86) PCT No.: PCT/KR2005/003716
§ 371 (c)(1),
(2), (4) Date: Sep. 24, 2007

(87) PCT Pub. No.: WO2006/101300
PCT Pub. Date: Sep. 28, 2006

(65) Prior Publication Data
US 2010/0177895 A1 Jul. 15, 2010

(30) Foreign Application Priority Data
Mar. 24, 2005 (KR) .................. 10-2005-0024433

(51) Int. Cl.
*H04N 7/167* (2011.01)
(52) U.S. Cl.
USPC ............ 380/270; 380/202; 380/203; 380/204
(58) Field of Classification Search
USPC .................. 380/270, 42, 200, 210, 202–204; 725/62–63
See application file for complete search history.

(56) References Cited

U.S. PATENT DOCUMENTS

| 5,246,652 | A | 9/1993 | Hsu et al. |
| 6,055,274 | A | 4/2000 | McVeigh |

(Continued)

FOREIGN PATENT DOCUMENTS

| EP | 1686711 A2 | 8/2006 |
| JP | 2002-300062 | 10/2002 |

(Continued)

OTHER PUBLICATIONS

International Search Report, PCT/KR2005/003716, mailed Feb. 16, 2006.

(Continued)

*Primary Examiner* — Eleni Shiferaw
*Assistant Examiner* — Phy Anh Vu
(74) *Attorney, Agent, or Firm* — Alston & Bird LLP (57) ABSTRACT

Disclosed is a system for transmitting encrypted broadcast signals to different transmitters on a single frequency network (SFN) in a digital broadcasting system. The system for transmitting encrypted broadcast signals on the SFN includes: a main broadcasting system for transmitting encrypted broadcast signals including data streams and transmitter identification information (TII) through a main broadcasting network; a repeating system for amplifying encrypted broadcast signals of the main broadcasting network and transmitting the amplified broadcast signals, or modulating and amplifying streams input by the main broadcasting system through a private line and repeating broadcast signals of the main broadcasting system through a repeating network; and a decrypting key provider for receiving a decrypting key value from the main broadcasting or repeating system and transmitting a user authentication and decrypting key to a charged subscriber terminal through a mobile communication network.

12 Claims, 5 Drawing Sheets

(56) References Cited

U.S. PATENT DOCUMENTS

| | | | |
|---|---|---|---|
| 6,157,719 A * | 12/2000 | Wasilewski et al. | 380/210 |
| 6,204,774 B1 | 3/2001 | Miwa et al. | |
| 6,741,834 B1 * | 5/2004 | Godwin | 455/3.01 |
| 6,999,513 B2 | 2/2006 | Sohn et al. | |
| 7,136,415 B2 | 11/2006 | Yun et al. | |
| 7,194,535 B2 * | 3/2007 | Hannel et al. | 709/224 |
| 7,194,769 B2 * | 3/2007 | Lippmann et al. | 726/25 |
| 7,661,119 B1 * | 2/2010 | Arsenault et al. | 725/48 |
| 7,787,433 B2 * | 8/2010 | Sato | 370/344 |
| 8,190,081 B2 * | 5/2012 | Cho et al. | 455/3.02 |
| 2002/0094040 A1 | 7/2002 | Oyagi | |
| 2002/0129249 A1 * | 9/2002 | Maillard et al. | 713/172 |
| 2003/0072257 A1 | 4/2003 | Ikedo et al. | |
| 2003/0095664 A1 | 5/2003 | Asano et al. | |
| 2003/0137963 A1 | 7/2003 | Suenaga et al. | |
| 2004/0072575 A1 | 4/2004 | Young et al. | |
| 2004/0093614 A1 | 5/2004 | Sakurai et al. | |
| 2005/0011163 A1 * | 1/2005 | Ehrensvard et al. | 53/410 |
| 2005/0123141 A1 | 6/2005 | Suzuki | |
| 2007/0224934 A1 | 9/2007 | Seo et al. | |
| 2008/0040609 A1 | 2/2008 | Giobbi | |
| 2010/0195828 A1 * | 8/2010 | Hong et al. | 380/255 |

FOREIGN PATENT DOCUMENTS

| | | |
|---|---|---|
| KR | 2003-36540 A | 5/2003 |
| KR | 2004-54444 A | 6/2004 |
| KR | 2004-84429 A | 10/2004 |
| KR | 2005-16722 A | 2/2005 |
| WO | WO99/01957 A1 | 1/1999 |
| WO | WO 01/22632 | 3/2001 |
| WO | WO 02/13073 | 2/2002 |

OTHER PUBLICATIONS

Corrected Version of International Preliminary Report on Patentability for PCT/KR2005/003715 dated Jul. 16, 2007.

Extended European Search Report from corresponding EP Application No. 05820424.9, dated Jun. 18, 2012 (11 pgs).

* cited by examiner

| Location | Subscriber Type | Received Key Value | Service Availability |
|---|---|---|---|
| A1 | Charged | Main Broadcasting Station TII | O |
| A2 | Charged | Main Broadcasting Station TII, Repeater Station TII | O |
| A3 | Charged | Repeater Station TII, Mobile Communication Decrypting Key | O |
| B1 | Uncharged | Main Broadcasting Station TII | O |
| B2 | Uncharged | Main Broadcasting Station TII, Repeater Station TII | O |
| B3 | Uncharged | Repeater Station TII | X |

SYSTEM FOR TRANSMITTING THE SCRAMBLED BROADCAST-SIGNALS IN SINGLE FREQUENCY NETWORK, AND A METHOD THEREOF

CROSS-REFERENCE TO RELATED APPLICATIONS

This application claims priority to PCT Application No. PCT/KR2005/03716, filed on Nov. 4, 2005, which claims the benefit of Korean Patent Application No. 10-2005-002433, filed on Mar. 24, 2005, both of which are incorporated by reference herein in their entirety.

TECHNICAL FIELD

The present invention relates to a system and method for transmitting encrypted broadcast signals on a single frequency network. More specifically, the present invention relates to a system and method for transmitting encrypted broadcast signals to respective transmission units in a digital broadcast system when the transmission units are different on the single frequency network.

BACKGROUND ART

Digital broadcasting has the characteristics of multiple channels, high quality, and multiple functions. In particular, digital broadcasting allows concurrent transmission of combined images, voice, and data irrespective of their contents and size because of the development of multiplexing capabilities, and also allows interactive services by using a return channel based on a modem. Accordingly, digital data broadcasting overcomes the limits of existing analog broadcasting and provides multimedia services with higher added values to viewers.

In general terrestrial and satellite digital broadcasting, a transmitter for forming a main broadcasting network is provided in a single frequency network (SFN), a shade region in which no service is available is generated in the SFN, and a gap filler for servicing the shade region is provided to eliminate the shade region of the main broadcasting network. For example, in a satellite digital multimedia broadcasting (DMB) system, most regions are available for receiving signals from a satellite, and the gap filler is used to acquire a receiving region in the shade regions in which no direct signal receiving is allowed, such as regions given in a subway, a tunnel, and a building.

In detail, when it is not easy to directly receive satellite signals on the ground side, that is, within the tunnel, underground, and building, the gap filler receives the satellite signals through a satellite signal receive antenna and starts broadcasting.

Main broadcasting stations represent broadcasting stations that function as a main center of the broadcasting network system, and they plan, produce, and transmit broadcasting programs. In Korea, radio broadcasting stations include KBS, MBC, CBS, BBS, PBS, SBS, and Keukdong Broadcasting, and television broadcasting includes KBS, MBC, and SBS. The broadcasting stations located in Seoul are established to be their transmitters. Commercial broadcasting in the USA or Japan form the broadcasting networks through contracts, but Korean broadcasting systems have a single organization such as KBS or have the same capital system such as MBC and CBS, and hence the transmitters perform a strong role in the system and management in addition to broadcasting, substantially as headquarters.

Also, a repeater station is an auxiliary station with less power, and is also called a satellite station. Conventionally, a broadcasting station has a service region, that is, a designated broadcasting region, but since boundary regions have weak radio wave arrival and blanket areas, the satellite station is installed for the boundary regions. It is installed at mountaintops for receiving radio waves from the transmitters, and it receives the waves through high-sensitivity receivers, electrically amplifies them, and broadcasts them as radio waves of different frequencies.

However, when a main broadcasting network service provider is different from a repeater service provider, the repeater service provider generates the cost of installing and maintaining a broadcasting network in the shade region, and the repeater service provider charges for the usage of the repeating network. That is, the repeater service must be a charged service for the purpose of activating the repeating network, but no appropriate treatment for the charged service has been provided up to now.

DISCLOSURE

Technical Problem

It is an advantage of the present invention to provide a system and method for transmitting encrypted broadcast signals on a single frequency network for activating a repeating network through a charged repeater service and allowing the main broadcasting network service provider to extend the broadcasting network by providing a charged repeater service from a repeater service provider in a terrestrial and satellite digital broadcasting system.

It is another advantage of the present invention to provide a system and method for transmitting encrypted broadcast signals on a single frequency network for controlling charged subscribers and uncharged subscribers to receive a service within a coverage of the main broadcasting network, controlling the uncharged subscribers to receive the service within a superimposed region of the main broadcasting network and the repeating network, and controlling the charged subscribers to receive the service within the coverage region of the repeating network in the broadcasting network with a single frequency network.

Technical Solution

In one aspect of the present invention, in a system for transmitting broadcast signals on a single frequency network (SFN) for terrestrial and satellite digital broadcasting, a system for transmitting encrypted broadcast signals on the SFN includes: a main broadcasting system for transmitting encrypted broadcast signals including data streams and transmitter identification information (TII) through a main broadcasting network; a repeating system for amplifying encrypted broadcast signals of the main broadcasting network and transmitting the amplified broadcast signals, or modulating and amplifying streams input by the main broadcasting system through a private line and repeating broadcast signals of the main broadcasting system through a repeating network; and a decrypting key provider for receiving a decrypting key value from the main broadcasting or repeating system and transmitting a user authentication and decrypting key to a charged subscriber terminal through a mobile communication network.

In another aspect of the present invention, in a method for transmitting broadcast signals on a single frequency network (SFN) for terrestrial and satellite digital broadcasting, a method for transmitting encrypted broadcast signals on the SFN includes: a) a system multiplexer of a main broadcasting station multiplexing service multiplexing data into broadcast signals; b) encrypting the broadcast signals and generating a encrypting key; c) inserting transmitter identification information (TII) to the encrypted broadcast signals so that a subscriber terminal may determine whether the encrypted broadcast signals are transmitted through a main broadcasting network or a repeating network; d) transmitting the encrypted broadcast signals to an uncharged or charged subscriber through the main broadcasting network; and e) providing a decrypting key of the encrypted broadcast signals to a mobile communication system through a mobile communication network or a private line.

BEST MODE

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts that are not described in the specification are omitted, and parts for which similar descriptions are provided have the same reference numerals.

In the embodiment of the present invention, data streams to be transmitted to a subscriber are encrypted so that a transmitter identifier may be used as a value for finding a key of the transmitted data streams and a receiving process may be controlled for the respective transmitters. In other words, a system and method for controlling a receiver to restrict access to each transmitter according to transmission units when the transmission units are different on a single frequency network in a terrestrial and satellite digital broadcasting system will be disclosed in the embodiment of the present invention.

In detail, charged subscribers and uncharged subscribers can receive a service within a coverage area of the main broadcasting network, and the charged subscribers can receive the service within the coverage area of the repeating network. Also, the uncharged subscribers and charged subscribers can concurrently receive the service within a superimposed coverage area of the main broadcasting network and the repeating network in the broadcasting network with a single frequency network. In this instance, it is needed as prerequisites that the service of the main broadcasting networks for uncharged subscribers may not be influenced by an addition of repeating networks, the service coverage of the main broadcasting networks may not be reduced, and service consecution is to be acquired when a handoff occurs between the main broadcasting network and the repeating network.

In the embodiment of the present invention, the network identification and the terminals' charged/uncharged subscription states are distinguished. The network identification function (NIF) uses the transmitter identification information (TII) of the terrestrial DMB standard (ETS 300.401 of Eureka-147 Rule) to assign identifiers to the broadcasting network and the repeating network, and efficiently manages the networks according to distinguished signals. Therefore, fundamental access interception and security are achieved on the data level by encrypting part of transmission data by using a TII-based key.

In this instance, the encrypting process is performed so as to prevent the terminal that has no NIF from being used on all the networks without network identification in advance, and in this instance, the encrypting process is not only applied to the repeating network because the signals work as interference in the signal-superimposed area differing from the signals of the main broadcasting network when the encrypting process is applied to the repeating network.

Figure 1:
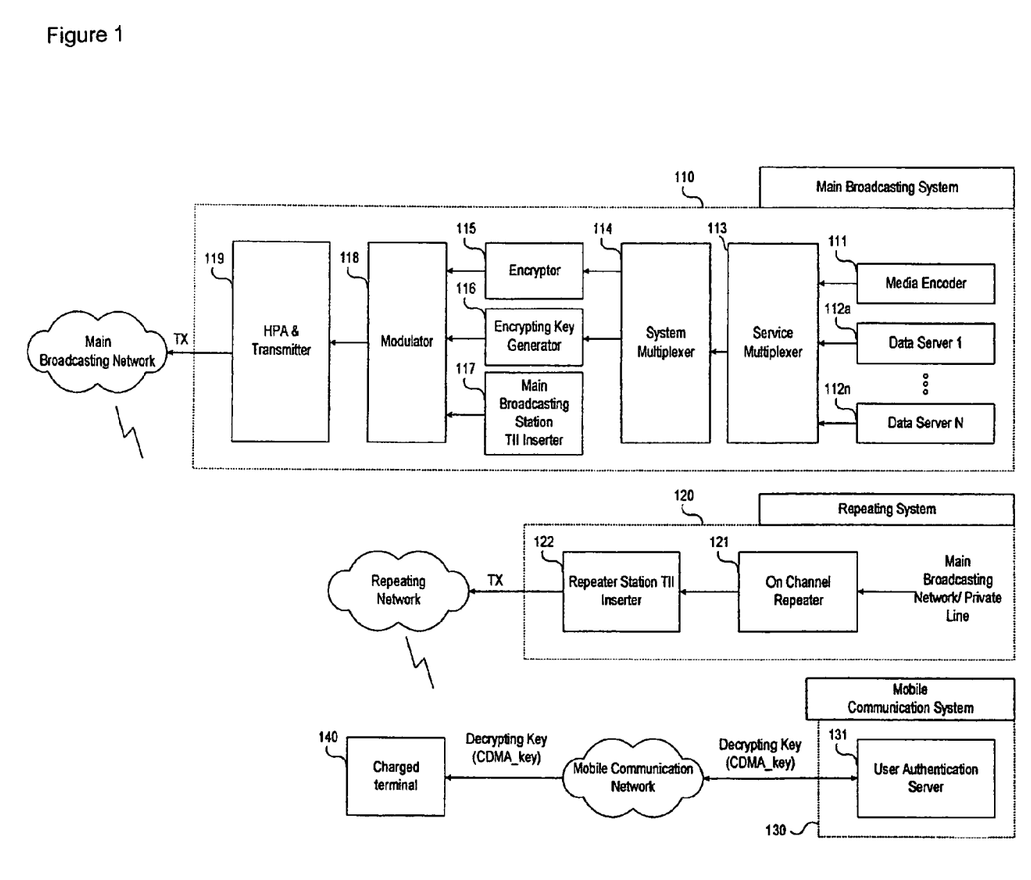
FIG. 1 shows a schematic diagram of a system for transmitting encrypted broadcast signals in a single frequency network according to an embodiment of the present invention.

FIG. 1 shows a schematic diagram of a system for transmitting encrypted broadcast signals in a single frequency network according to an embodiment of the present invention.

Referring to FIG. 1, the system for transmitting encrypted broadcast signals in a single frequency network includes a main broadcasting system 110 for transmitting the transmitter identification information (TII), a mobile communication system 130 for authenticating a user and transmitting a key value for allowing a conditional access through a mobile communication network, a repeater system 120 for repeating streams of the main broadcasting station, and a subscriber terminal 140 for processing the repeated streams. Hereinafter, the main broadcasting system 110 will be correspondingly used as a main broadcasting station and the repeater system 120 will be correspondingly used as a repeater station.

First, the system for transmitting encrypted broadcast signals in a single frequency network adds an encryptor and an encrypting key generator to the main broadcasting station so that multimedia contents are encrypted by using TII and conditional access, and the main broadcasting station 110 adds an encryptor 115 to the existing broadcasting system to thus scramble multimedia programs or contents, generate an encrypting key, and apply TII so that a subscriber terminal may identify that the encrypted broadcasting signals are transmitted through the main broadcasting network.

Also, in the embodiment of the present invention, in the case of the single frequency network (SFN), data for the main broadcasting network and the repeating network are configured to have the same streams and guarantee signal synchronization so that the broadcasting networks are formed without interference between the main broadcasting network and the repeating network.

In this instance, the TII is used as information for identifying the transmitter, and is used for transmitter identification and a decrypting key, and the TII substantially controls the subscriber terminal to determine whether the broadcasting signals are transmitted through the main broadcasting network or the repeating network. In this instance, in the case of the above-noted TII, no interference of the SFN occurs when pieces of the TII are different. The TII does not provided in the data area and is established by the combinations of subcarriers of an OFDM sync channel, the combinations are arranged to be not repeated, and hence the IDs of the received transmitters can be distinguished when at least two signals are received in the SFN.

The main broadcasting station 110 establishes TII of the main broadcasting station and applies the TII so as to protect a corresponding encrypting key, and periodically modifies the TII of the main broadcasting station 110 and applies the modified TII when performing corresponding encrypting.

Further, the main broadcasting station generates an encrypting key for encrypting an encrypting algorithm and data to which an encrypting key generation algorithm is applied and which are then transmitted, and scrambles transmission data according to the corresponding encrypting key, and the subscriber terminal 140 finds a decrypting key corresponding to the received TII and decrypts the data.

Also, the repeater station 120 amplifies frequency network signals corresponding to the SFN and transmits the amplified signals, or modulates streams input by the main broadcasting station 110 through private lines, amplifies the modulated signals, and transmits the amplified signals. Also, when repeating the streams input by the main broadcasting station 110, the repeater station 120 re-allocates a repeater station TII value to be different from the main broadcasting station TII value according to an encrypted function, and transmits it.

For example, a repeating network server (not illustrated) of the repeater station 120 gathers transmission signals of six service providers to generate TII, modulates it based on the TDM scheme, and outputs modulated results to a satellite terrestrial station for the purpose of repeating broadcast programs.

Also, the repeater station 120 generates a key used for encrypting, and transmits the key to the main broadcasting station or the repeater station or transmits the same through a mobile communication network, and in this instance, distinguishes charged subscribers and manages subscribers. That is, the repeater station 120 generates repeater station TII and a decrypting key (CDMA_Key) so as to manage and control the repeating network center, manages three keys (main broadcasting station TII, repeater TII, and a decrypting key) in an integrated manner, and periodically updates the keys.

Further, the mobile communication system 130 transmits the decrypting key value to the terminal 140 of a charged subscriber through the mobile communication network.

In addition, the subscriber terminal 140 decrypts the encrypted signals of the main broadcasting network included in the broadcasting signals received through the main broadcasting network or the repeating network, the TII, and the encrypting key according to a predefined decrypting scheme.

In further detail, referring again to FIG. 1, the main broadcasting station 110 includes a media encoder 111, a plurality of data servers 112a to 112n, a service multiplexer 113, a system multiplexer 114, a encryptor 115, a encrypting key generator 116, a main broadcasting station TII inserter 117, a modulator 118, and an HPA/transmitter 119. In this instance, the TII is a proper identifier assigned to the transmitter, the TII signal is transmitted through a synchronous channel, and the TII can be used together with frequency information (FI) in the SFN.

The service multiplexer 113 multiplexes pieces of additional to information related to audio, data, and video data respectively provided by the contents provider's media encoder 111 or the data servers 112a to 112n. The audio service is transmitted through an independent channel so as to provide a CD-quality audio service. The data service can be used to transmit text data such as lyrics of the audio service. Since the video service must include moving pictures, audio, and multiplexing/synchronizing information, the video service is transmitted after it is multiplexed into a stream through a video multiplexer. In this instance, the audio, the data, and the video service are multiplexed into a service channel by a service multiplexer, it is combined with transmission data to be a frame by a system multiplexer, and it is then transmitted through a physical channel. In this instance, the conditional access function is not performed by the video multiplexer, encrypting is performed by the encryptor, and decrypting is performed through a main broadcasting station TII.

The system multiplexer 114 multiplexes the data that is multiplexed by the service multiplexer 113 into broadcast signals in a transmission frame format.

The encryptor 115 scrambles the broadcast signals transmitted by the system multiplexer 114, and in this instance, the main broadcasting station TII inserter 117 inserts TII into the broadcast signals. That is, the main broadcasting station scrambles multimedia programs or contents, transmits a decrypting key for decrypting the broadcast signals according to a predetermined encrypting scheme, and inserts TII for determining whether the network having transmitted the broadcast signals is a main broadcasting to station or a repeater station. That is, the main broadcasting station and the repeater station transmit TII for determining by the subscriber station whether the transmitted broadcast signals are main broadcasting station signals or repeater station signals.

The modulator 118 modulates the encrypted broadcast signals and the inserted main broadcasting station TII, and the HPA/transmitter 119 transmits the modulated broadcast signals to the subscriber through the main broadcasting network. In this instance, the high power amplifier (HPA) represents a high power amplifier with good linearity from among power amplifiers (PAs), and it receives signals from a frequency upconverter and amplifies the signals so as to generate defined radio frequency outputs to the transmitter's final output terminal.

Further, the repeater station 120 may include an on-channel repeater 121 and a repeater station TII inserter 122, and in this instance, the repeater station 120 amplifies and transmits signals of the main broadcasting network corresponding to the SFN, or modulates, amplifies, and repeats the stream input by the main broadcasting station through the private line. In the case of repeating the stream, the TII value of the repeater station is re-allocated to be different from the value of the main broadcasting station so that it is disallowed for the uncharged subscribers to receive signals within the coverage of the repeating network.

Also, the repeater station 120 receives an ensemble transport interface (ETI) signal of the main broadcasting station 110, transmits the ETI signal to an energy distribution encryptor, a convolutional encoder, and a time interleaver to multiplex the signal into a TDM signal, and transmits the result signal for the purpose of satellite transmission. In this instance, a TII value to be used on the repeating network by using a specific field of the TDM signal is inserted into the repeater station 120.

That is, the repeater station 120 receives the TDM signal from the satellite and demodulates it into an OFDM signal, and in this instance, it extracts the TII value included in the TDM signal and inserts the TII value into the on channel of the OFDM signal. In this instance, since the TII value to be used for the repeating network is different from the TII value used by the main broadcasting network, the TII value of the repeating network is selected and inserted into the TDM field so that the keys to be decrypted by the receiver may have the same value.

Further, the mobile communication system 130 includes a user authentication server 131, and functions as a decrypting key provider for transmitting a decrypting key for decrypting the encrypted broadcast signals to a charged subscriber's terminal. Also, the mobile communication system 130 periodically transmits the decrypting key through the mobile communication network or the Internet so that the subscriber terminal may decrypt the received key and may extract the corresponding encrypting key.

Also, the charged subscriber terminal receives the decrypting key from an encrypting server through the mobile communication system to decrypt the conditionally accessed broadcast signals, and thereby receives a charged service from the repeating network.

Figure 2:
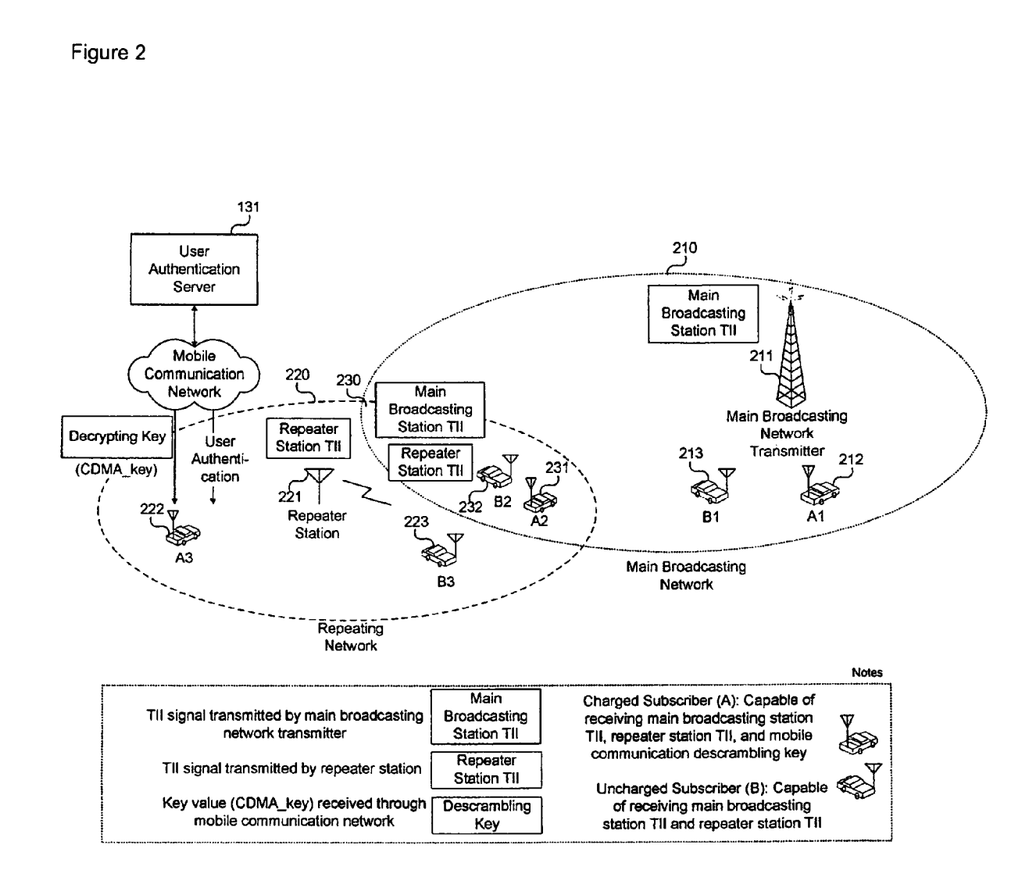
FIG. 2 shows a schematic diagram for a service for transmitting encrypted broadcast signals in a single frequency network according to an embodiment of the present invention.

FIG. 2 shows a schematic diagram of a conditional access service depending on a transmitter on the single frequency network (SFN) according to an embodiment of the present invention.

Referring to FIG. 2, the conditional access service area depending on a transmitter on the SFN includes a main broadcasting network 210, a repeating network 220, and a superimposed area 230 of the main broadcasting network coverage and the repeating network coverage.

The main broadcasting network 210 has a main broadcasting network transmission station 211, and a charged subscriber 212 (A1) and an uncharged subscriber 213 (B1) receive the main broadcasting station TII transmitted by the main broadcasting network transmission station 211 as a key value.

The repeating network 220 has a repeater station 221, and a charged subscriber 222 (A3) and an uncharged subscriber 223 (B3) receive the repeater station TII transmitted by the repeater station 221 as a key value. In this instance, since a decrypting key value is transmitted from the user authentication server 131 to the charged subscriber 222 on the repeating network 220 through the mobile communication network, the charged subscriber 222 on the repeating network 220 can receive a broadcasting service, but the uncharged subscriber 223 can receive no broadcasting service because he has no decrypting key.

Also, in the superimposed area 230 of the main broadcasting network coverage and the repeating network coverage, the charged subscriber 231 (A2) and the uncharged subscriber 232 (B2) receive the main broadcasting station TII from the main broadcasting network transmission station 211 or repeater station TII from the repeater station 221.

In other words, the embodiment of the present invention has a configuration allowing conditional access of the broadcasting network according to encryption and decryption, and the charged subscribers A1, A2, and A3 can receive the main broadcasting station TII, repeater station TN, and mobile communication decrypting key, and the uncharged subscribers B1, B2, and B3 can receive the main broadcasting station TII and repeater station TII, and as a result, as to the combination of received keys, the main broadcasting station TII transmitted by the main broadcasting station or the decrypting key received from the mobile communication network is determined to be key combination to be decrypted.

Figure 3:
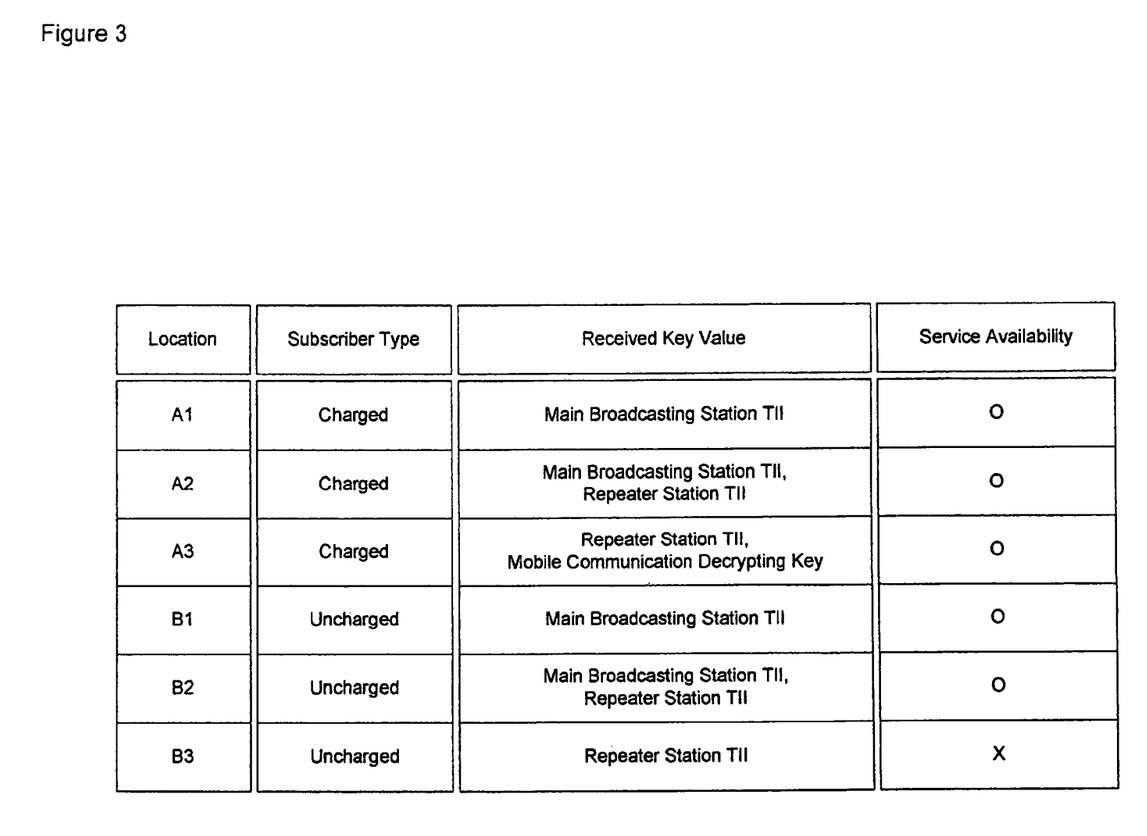
FIG. 3 shows conditional access service availability for subscriber types and receiving locations according to an embodiment of the present invention.

FIG. 3 shows conditional access service availability for subscriber types and receiving locations according to an embodiment of the present invention.

FIG. 3 shows combinations that are received according to the subscriber receiver's locations and subscription types shown in FIG. 2. The charged subscribers can receive services from both the main broadcasting network and the repeating network, and the uncharged subscribers can receive them from the main broadcasting network, thereby allowing the conditional access to the respective transmitters.

Figure 4:
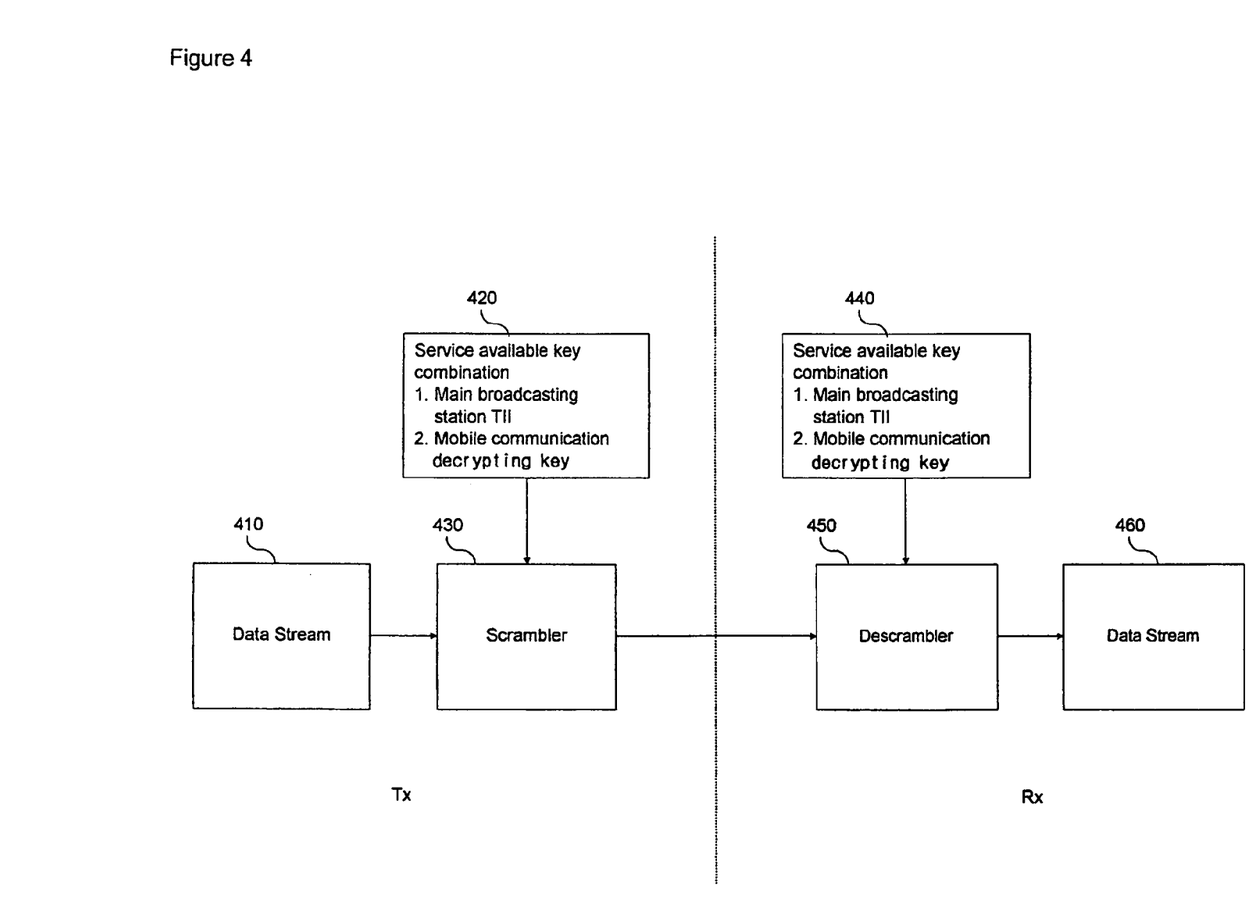
FIG. 4 shows a block diagram for encrypted transmission and receiving in a system for transmitting encrypted broadcast signals on a single frequency network according to an embodiment of the present invention.

FIG. 4 shows a block diagram for encrypted transmission and receiving in a system for transmitting encrypted broadcast signals on a single frequency network according to an embodiment of the present invention.

Referring to FIG. 4, the data stream 410 on the transmission side is encrypted through a scrambling process by the scrambler 430, and in this instance, by the main broadcasting station's TII value or the mobile communication decrypting key 420. Here, the encrypting represents the process of encrypting the multimedia data to be transmitted according to a predetermined rule and modifying the signals so that the receiver who has no access rights may not view the encrypted data.

Also, regarding the key for decrypting the signals on the receiving side, the descrambler 450 descrambles the encrypting according to the main broadcasting station's TII value or the mobile communication decrypting key 440 to decrypt the signals into the original data stream 460.

In this instance, the uncharged subscriber can receive the main broadcasting station's TII value, and the charged subscriber can receive both the main broadcasting station's TII value and the mobile communication decrypting key.

Therefore, the uncharged subscriber can receive the main broadcasting station's TII value from the main broadcasting network and can receive no TII value from the repeating network since the repeating network transmits the repeater station TII value that is different from the main broadcasting station TII value to the uncharged subscriber. The charged subscriber can receive the TII value from the main broadcasting network and can receive the same by using the decrypting key received from the mobile communication network on the repeating network.

The problem on the transmission side is that the uncharged subscriber can receive the TII value from the repeating network when the uncharged subscriber stores the TII value received from the main broadcasting network and moves to the repeating network. In order to solve the problem, an encrypting server in the main broadcasting station periodically modifies the main broadcasting station TII value and applies the modified TII value to the encrypting of the corresponding data stream.

Figure 5:
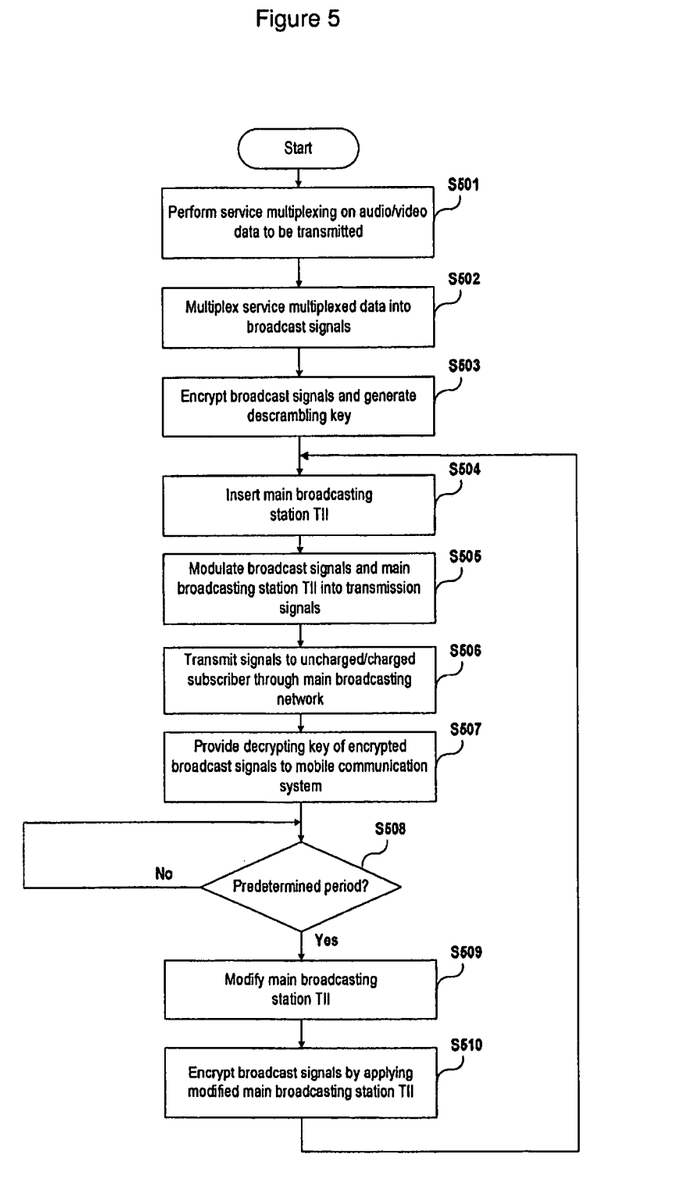
FIG. 5 shows an operational flowchart of a method for transmitting encrypted broadcast signals on a single frequency network according to an embodiment of the present invention.

FIG. 5 shows an operational flowchart of a method for transmitting encrypted broadcast signals on a single frequency network according to an embodiment of the present invention.

Referring to FIG. 5, in the method for transmitting encrypted broadcast signals on the SFN, service multiplexing is performed on the audio/video data to be transmitted by the service multiplexer of the main broadcasting station in step S501.

The system multiplexer of the main broadcasting station multiplexes the service multiplexed data into broadcast signals in step S502.

The broadcast signals are encrypted and an encrypting key is generated in step S503. In this instance, general encrypting methods are applicable to the method for encrypting broadcast signals and generating an encrypting key, which is obvious to a person skilled in the art and which will not be described.

TII is inserted into the encrypted broadcast signals in step S504 so that the subscriber terminal may determine whether the encrypted broadcast signals are transmitted through the main broadcasting network or the repeating network. The encrypted broadcast signals and the main broadcasting station TII are modulated into transmission signals in step S505.

The encrypted broadcast signals are transmitted to the uncharged or charged subscriber through the main broadcasting network in step S506.

The decrypting key of the encrypted broadcast signals is provided to the mobile communication system through a mobile communication network or a private line in step S507. In this instance, when the encrypted broadcast signals are conditionally accessible, the mobile communication system transmits the decrypting key for decrypting the conditionally accessible broadcast signals to the charged subscriber terminal according to a request by the charged subscriber terminal.

The main broadcasting station checks a predetermined period in step S508, modifies the main broadcasting station TII for each predetermined period in step S509, and applies the modified main broadcasting station TII to scramble the broadcast signals in step S510. Substantially, the modified TII is inserted into the encrypted broadcast signals and they are then transmitted.

In this instance, when the subscriber terminal is in the repeating network, the mobile communication system transmits a decrypting key for decrypting the encrypted broadcast signals according to the request by the charged subscriber terminal. That is, as described above, when the uncharged subscriber terminal is in the repeating network, the access is conditional because of the encrypted broadcast signals, it is needed to change the uncharged subscriber terminal to a charged subscriber terminal so as to cancel the conditional access, and the encrypted broadcast signals can be decrypted after a decrypting key is provided from the mobile communication system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, the repeater service provider can activate repeater business when the repeater service provider provides charged repeater services according to the encrypted signal transmitting method on the SFN, and the main broadcasting network service provider can increase broadcasting networks.

The invention claimed is:

1. A system for transmitting encrypted broadcast signals on a single frequency network (SFN) for terrestrial and satellite digital broadcasting, comprising:
a main broadcasting unit comprising a hardware processor configured to transmit the encrypted broadcast signals including data streams and transmitter identification information (TII) of the main broadcasting unit through a main broadcasting network;
a repeating unit comprising a hardware processor configured to:
amplify the encrypted broadcast signals of the main broadcasting network and transmit the amplified encrypted broadcast signals, and
modulate and amplify the data streams input by the main broadcasting unit through a private line and repeat the encrypted broadcast signals of the main broadcasting unit through a repeating network;
a decrypting key provider comprising a hardware processor configured to:
receive a decrypting key value from at least one of the main broadcasting unit and the repeating unit, and
transmit a user authentication and decrypting key to a charged subscriber terminal through a mobile communication network,
wherein the TII of the main broadcasting unit is included in the encrypted broadcast signals transmitted from the main broadcasting unit and is used to decrypt the encrypted broadcast signals received by a subscriber terminal on the main broadcasting network,
wherein a repeating system TII value of the repeating unit is included in the encrypted broadcast signals transmitted from the repeating unit and is used to decrypt the encrypted broadcast signals received in a subscriber terminal on the repeating network,
wherein the repeating unit is configured to allocate the repeating unit TII value, which is different from the TII of the main broadcasting unit, and transmits the repeating unit TII value when repeating at least one of the data streams.

2. The system of claim 1, wherein the main broadcasting unit comprises:
a service multiplexer configured to multiplex audio, data, and video data respectively provided by a contents provider with related additional information;
a system multiplexer configured to multiplex the data multiplexed by the service multiplexer into broadcast signals in a transmission frame format;
an encryptor configured to encrypt the broadcast signals transmitted by the system multiplexer;
an encrypting key generator configured to generate an encrypting key from the system multiplexer;
a main broadcasting station TII inserter configured to insert the TII into the encrypted broadcast signals;
a modulator configured to modulate the encrypted broadcast signals and the TII; and
a transmitter configured to transmit the encrypted broadcast signals as modulated to a subscriber through the main broadcasting network.

3. The system of claim 1, wherein the main broadcasting unit is configured to:
scramble at least one of multimedia programs and contents, and
transmit a decrypting key for decrypting the encrypted broadcast signals according to a predetermined encrypting method.

4. The system of claim 1, wherein the repeating unit is configured to transmit the repeater TII value in the repeater encrypted broadcast signals such that the charged subscriber terminal is configured to determine based on the TII that the encrypted broadcast signals are main broadcasting network signals.

5. The system of claim 1, wherein the main broadcasting unit is configured to periodically generate modified TII by modifying the TII, and apply the modified TII when corresponding encrypting is performed.

6. The system of claim 1, wherein the main broadcasting unit is configured to apply the TII as a key value of transmission streams and enables conditional access to respective transmitters, the TII being used to receive different values from transmitters on the SFN.

7. The system of claim 1, wherein the decrypting key provider is configured to periodically transmit the decrypting key to the charged subscriber terminal through at least one of the mobile communication network and the Internet.

8. The method of claim 1, wherein the decrypting key provider is a mobile communication system comprising a user authentication server.

9. A method for transmitting broadcast signals on a single frequency network (SFN) for terrestrial and satellite digital broadcasting, comprising:
- multiplexing, by a main broadcasting station, data into broadcast signals;
- encrypting the broadcast signals;
- generating an encrypting key;
- inserting transmitter identification information (TII) of the main broadcasting station into the encrypted broadcast signals to enable a subscriber terminal to determine whether the encrypted broadcast signals are transmitted through at least one of a main broadcasting station and a repeating system, wherein the repeating system repeats the encrypted broadcast signals of the main broadcasting station through a repeating network;
- transmitting the encrypted broadcast signals to at least one of an uncharged subscriber and a charged subscriber through the main broadcasting station; and
- providing a decrypting key of the encrypted broadcast signals to a mobile communication system, wherein the providing is through a mobile communication network,
- wherein the TII of the main broadcasting station is included in encrypted broadcast signals transmitted from the main broadcasting station and is used to decrypt the encrypted broadcast signals received in a subscriber terminal on the main broadcasting network,
- wherein a repeating TII value of the repeating system is included in the encrypted broadcast signals transmitted from the repeating system and is used to decrypt the encrypted broadcast signals received in a subscriber terminal on the repeating network, and
- wherein the repeating system is configured to allocate the repeating TII value, which is different from the TII of the main broadcasting station, and transmits the repeating TII value when repeating at least one data stream of the main broadcasting station.

10. The method of claim 9, further comprising:
- the main broadcasting station periodically modifying the TII to create a modified main broadcasting station TII,
- applying the modified main broadcasting station TII to scramble broadcast signals to create scrambled broadcast signals, and
- transmitting the scrambled broadcast signals.

11. The method of claim 9, further comprising the mobile communication system transmitting the decrypting key for decrypting the encrypted broadcast signals according to a request by the charged subscriber terminal.

12. The method of claim 9 further comprising providing a user authentication server in the mobile communication system.

* * * * *